United States Patent [19]
Kallenbach et al.

[11] Patent Number: 5,303,155
[45] Date of Patent: Apr. 12, 1994

[54] METHOD OF GENERATING CONTROL/REGULATION SIGNALS FOR A VEHICLE CHASSIS

[75] Inventors: Rainer Kallenbach; Dieter Kunz, both of Stuttgart; Klaus Landesfeind, Fellbach, all of Fed. Rep. of Germany

[73] Assignee: Robert Bosch GmbH, Gerlingen-Schillerhohe, Fed. Rep. of Germany

[21] Appl. No.: 719,806

[22] Filed: Jun. 24, 1991

[30] Foreign Application Priority Data

Jun. 23, 1990 [DE] Fed. Rep. of Germany ....... 4020107

[51] Int. Cl.$^5$ ............................................. B60G 17/015
[52] U.S. Cl. ............................ 364/424.05; 364/424.01; 280/707
[58] Field of Search ....................... 364/424.05, 424.01; 280/707

[56] References Cited

U.S. PATENT DOCUMENTS

| | | | |
|---|---|---|---|
| 4,712,807 | 12/1987 | Kurosawa | 280/707 |
| 4,834,205 | 5/1989 | Mizuno et al. | 180/141 |
| 4,888,696 | 12/1989 | Akatsu et al. | 364/424.05 |
| 4,943,083 | 7/1990 | Groves et al. | 280/707 |
| 4,947,326 | 8/1990 | Mori et al. | 364/424.05 |
| 4,999,777 | 3/1991 | Schussler et al. | 364/424.05 |
| 5,016,908 | 5/1991 | Athanas et al. | 280/707 |
| 5,043,909 | 8/1991 | Meyers et al. | 364/484 |
| 5,068,793 | 11/1991 | Condne et al. | 364/424.05 |
| 5,073,860 | 12/1991 | Blackburn et al. | 364/424.05 |
| 5,081,587 | 1/1992 | Okano | 364/424.05 |
| 5,110,152 | 5/1992 | Jones | 364/424.05 |
| 5,114,177 | 5/1992 | Fukunaga et al. | 364/424.05 |
| 5,168,448 | 12/1992 | Matsumoto et al. | 364/424.05 |
| 5,189,615 | 2/1993 | Rubel et al. | 364/424.05 |

*Primary Examiner*—Thomas G. Black
*Assistant Examiner*—Tan Q. Nguyen
*Attorney, Agent, or Firm*—Baker & Daniels

[57] ABSTRACT

Described is a process for conditioning of sensor signals for at least one of undercarriage regulation and control. The objective of this process is to superimpose on processed first signals which represent the acceleration of the vehicle body the low-frequency information absent from the signal of a vehicle body acceleration sensor by a circuit of simple design through a defined superimposition with the sensor signals corresponding to at least one of the spring deflection path and the spring deflection velocity. For that purpose, the sensor signals to be superimposed are processed in filter units whose transfer functions show a specific functional correlation.

4 Claims, 3 Drawing Sheets

METHOD OF GENERATING CONTROL/REGULATION SIGNALS FOR A VEHICLE CHASSIS

BACKGROUND OF THE INVENTION

The invention concerns a process for the conditioning of sensor signals utilized for the control and regulation of motion sequences, specifically for undercarriages of passenger cars and trucks.

Essential for the design of the undercarriage of an automobile is an efficient suspension and/or damping system. Such suspension and/or damping system normally consists either of a suspension arrangement with a fixed spring constant, paralleled by a damping device with adjustable damping, and/or of a suspension arrangement with adjustable spring constant. Furthermore, an essential element of such a suspension and/or damping system is an efficient process for control or regulation of the adjustable undercarriage. Based on information from sensor signals that monitor the suitability of the vehicle for road conditions i.e. road worthiness of the vehicle, such a process provides activation signals for the actuators of the adjustable undercarriage.

A suspension and/or damping system should ideally control or regulate the adjustable undercarriage in such a way that, for one, allowance is made for road safety and, for another, the passengers and/or shock-sensitive load of a vehicle are afforded maximum travel comfort. From the vantage point of the suspension and/or damping system, these are conflicting objectives. High travel comfort can be achieved through a maximally soft undercarriage adjustment, whereas with regard to high road safety a maximally hard undercarriage adjustment is desirable.

Known from the German patent application P 39 18 735.7 is a process for the damping of motion sequences on undercarriages of passenger cars and trucks. The activation signals for control or regulation of the adjustable undercarriage are essentially generated by the processing of sensor signals in filter arrangements. These filters are so conceived that the sensor signals that provide information on the roadworthiness of the vehicle will be influenced in their amplitude and/or phase pattern. Activation signals for the adjustable undercarriage are generated by this influencing, effecting thereby an adaptation to the current motional state of the vehicle, in such a way that at critical driving situations an undercarriage adjustment serving road safety and in uncritical driving situations a comfort adjustment is effected.

A comfort undercarriage adjustment can be achieved, for instance, in that the adjustable undercarriage features a maximally soft adjustment, i.e., for instance a slight damping in the case of an adjustable shock absorber. Control or regulation of the undercarriage that is more efficient by far, for instance in view of the bouncing, pitching and rolling oscillations of the vehicle body that determine the travel comfort, can be achieved through a so-called frequency contingent "skyhook" regulation such as described in the German patent application P 39 18 735.7 and in the German patent disclosure 37 38 284.

In the so-called skyhook control, the body acceleration is reduced thus bringing about an improvement of the travel comfort, whereas the road safety is not directly increased. Generally known in undercarriage control, this control concept is based on the model notion of a damping and/or suspension system which acts on vehicle body mass and is connected with an inertial fix point. Since such an inertial damping and/or suspension system cannot be directly realized in practice, the damping and/or suspension system arranged between the vehicle body mass and the wheel mass (refer to FIG. 1) is appropriately activated as a substitute.

Such a regulation or control is to be given preference whenever the momentary driving situation is not critical. In these driving situations, which in the normal vehicle operation usually occur much more frequently by far, not only relative path signals such as the spring deflection path are utilized for the control or regulation of the adjustable undercarriage, but also the absolute speed of the vehicle body is allowed for. The variables mentioned here will be explained in detail in FIG. 1.

An essential element for realizing the skyhook control is knowing the absolute vehicle velocity and/or of the buildup path. These variables are generally obtained from the signals of an acceleration sensor through appropriate signal conditioning.

Since each sensor has a limited working range outside of which the sensor does not deliver a useful signal, a signal conditioning is necessary, for instance in the form of band-pass filters. This band-pass filtering can be realized electronic-digitally, for instance by processing in computer units a differential equation that represents the transfer properties, or in an electronic-analog way by simulation of a differential equation representing the transfer properties, using electronic components. In order to obtain the useful signals of a sensor, the sensor signals are usually influenced in their frequency response by band-pass filters such as high-pass and low-pass filters. Moreover, depending on the requirements of the regulation or control with regard to the input data, integrating stages and/or differentiating stages are passed which, in turn, are of an electronic-digital or analog design.

When using the signals of a body acceleration sensor for the skyhook control, the integrity of the control or regulation is limited in the low-frequency range (about 0.1 to 1 Hz) of the vehicle body movements. This is attributable to the fact that the signals of the acceleration sensors used are filtered by filter units with high-pass type transfer behavior in order to avoid offset and drift effects.

For damping the inherent movement of the masses of a linear two-mass vibrator, the German patent disclosure 37 38 048 proposes to determine from the vehicle body acceleration path and spring deflection path or the spring deflection signals, respectively, the vertical absolute velocities of body and wheel. These absolute velocities are weighted and utilized for activation of the damping elements. In so doing, the German patent disclosure 37 38 048 is based on an ideal capturing and integration of the body acceleration.

The problem underlying the present invention is to provide an optimized processing of real vehicle body acceleration signals.

SUMMARY OF THE INVENTION

The present invention solves the above described problem by means of a novel process and circuit. The inventional conditioning of an acceleration sensor signal $Xa''$ achieves a distinct improvement of undercarriage control, specifically according to the skyhook strategy, in the low-frequency range of the body movements.

To obtain from the signal of the acceleration sensor measuring the vehicle body acceleration $Xa''$ the useful signal and the absolute body velocity $Xa'$ and/or the body travel $Xa$ required for undercarriage control, the $Xa''$ sensor signal is processed in units exhibiting a high-pass and/or low-pass type performance and/or comprise one or two integrating stages. The transfer performance of these filter units can be combined in the transfer function $G1(s)$, where s is the Laplace variable that is customarily used for describing the transfer performance.

Additional relative movement signals determined by sensors, such as the spring deflection path and/or spring deflection velocity, are inventionally processed by filter units whose transfer function $G2(s)$ correlates functionally (mathematic functional rule) with $G1(s)$. These relative path signals contain the low-frequency signal information that are absent from the $Xa''$ signal. Thus conditioned, the relative path signals, as described above, are superimposed on the conditioned $Xa''$ signals. This can be performed, for instance, also weighted. Obtained in this way are vehicle body acceleration signals that are supplemented by the low-frequency information. These complemented body movement signals can then be utilized for the further regulation or control of motion sequences of the undercarriage.

The core of the invention is to boost the effect of an undercarriage control, for instance according to the skyhook control strategy, when using real signals from body acceleration sensors, in that for the low frequencies additional signal shares from the measured spring deflection paths or spring deflection velocities are allowed for. These additional components may be called "groundhook" shares.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings wherein.

Figure 1:
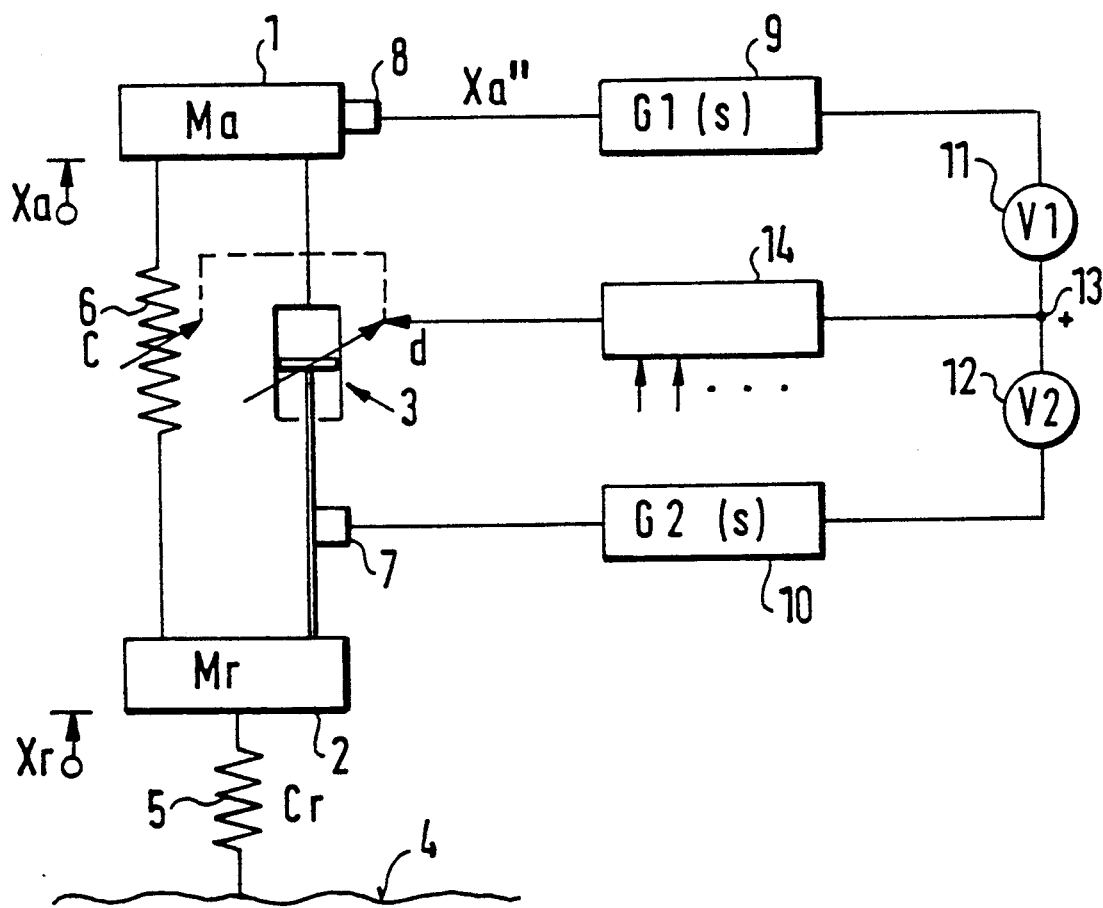
FIG. 1 is a schematic representation of the circuit according to the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

The invention will be illustrated in these embodiments in exemplary fashion, with the aid of the drawing, on a wheel unit.

Figure 2:
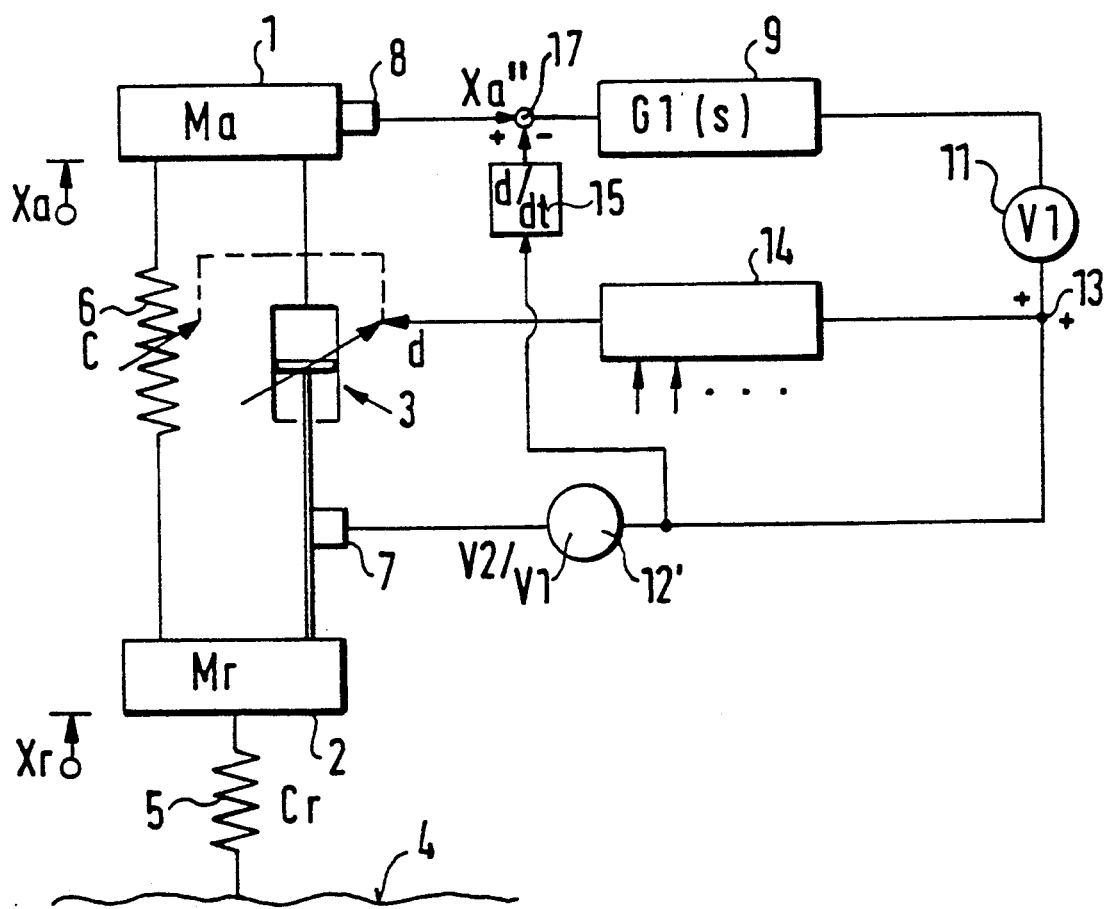
FIG. 2 is an alternative embodiment of the circuit of FIG. 1.
Figure 3:
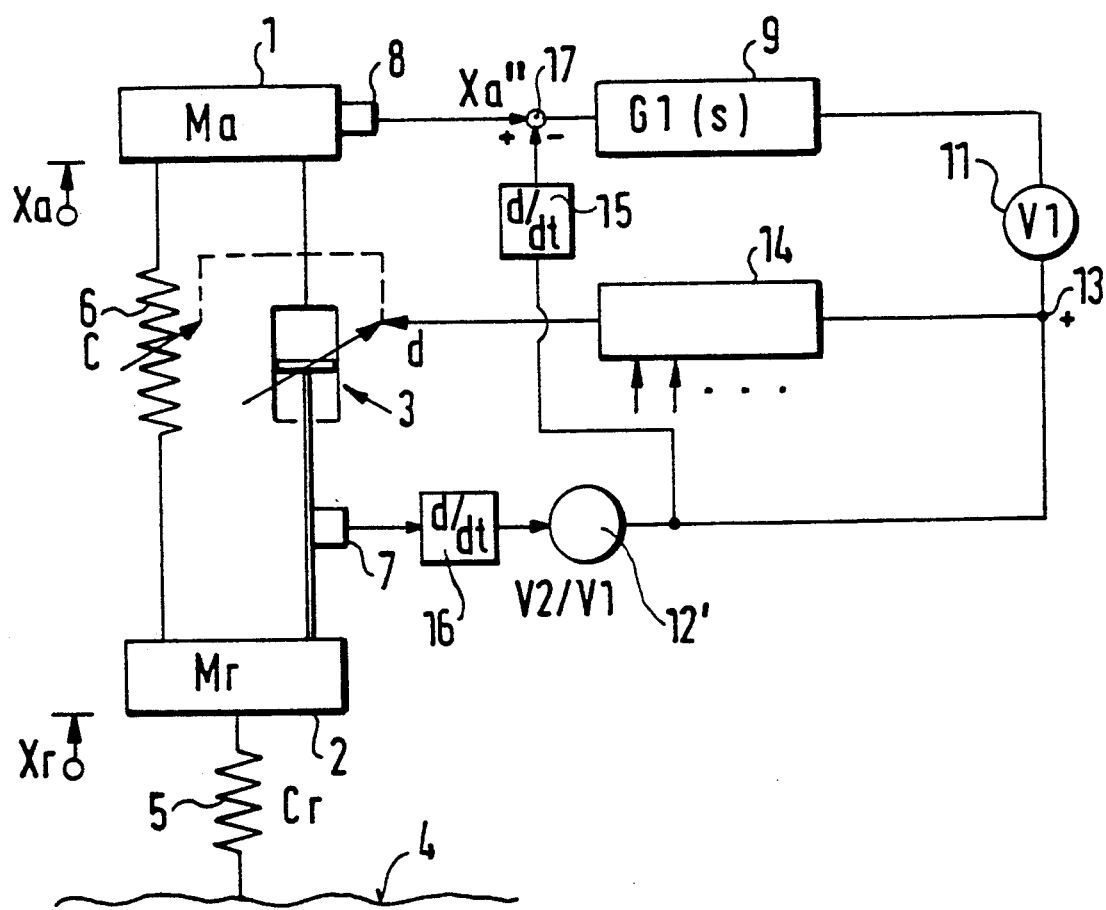
FIG. 3 is another alternative embodiment of the circuit of FIG. 1.

FIGS. 1, 2 and 3 each show the left part of the damping and/or suspension system for a wheel unit that is to be controlled or regulated. Marked 1 is the vehicle body with the proportional mass $Ma$. Marked 2 is the wheel with the proportional wheel mass $Mr$ while 5 signifies a spring with the spring constants $Cr$. The road surface is marked 4. A shock absorber 3 with damping constant d, along with a spring 6 (spring constant C) arranged parallel, represents the undercarriage to be controlled or regulated. The shock absorber 3 and/or the spring 6 are of a controllable design. Marked 8 is a first sensor means for capturing the first signals $Xa''$ representing the acceleration of the vehicle body, while 7 signifies a second sensor means for capturing second signals $Xar$, $Xar'$ or $dP$ representing the relative movements between the vehicle body and the wheels.

References 1, 2, 3, 4, 5 and 6, in FIGS. 1, 2 and 3 illustrate a two-body model for a wheel unit. The wheel is in contact with the road surface 4, thereby describing the wheel and/or tire stiffness as spring 5 with the spring constant $Cr$ in model fashion. For control or regulation of the undercarriage, the shock absorber 3 and/or the spring 6 may be of a controllable design. This is achieved, for one through a spring system with a variable spring stiffness C and/or through a damping system with a variable-design damping performance d. $Xa$ or $Xr$ signifies the displacement of the vehicle body or the displacement of the wheel relative to a common reference system, whereas the values $Xe$, measured in the same reference system, represent unevennesses of the ground.

To begin with, the basic inventional idea shall be illustrated with the aid of a circuit example (FIG. 1). The circuit examples shown in FIGS. 2 and 3 concern further developments of the invention, which in terms of control are equivalent to the variant described in FIG. 1.

In FIG. 1, the measured (real) first signals $Xa''$ are transmitted to the first means 9. The transfer performance of the first means 9 can be described by the transfer function $G1(s)$, where the variable s is the Laplace variable customarily used for describing the transfer performance.

Since the vehicle body velocity and/or the body path are needed as signals for the control or regulation of the undercarriage, the first means 9 having the transfer function $G1(s)$ displays an integrated performance. In addition to this performance, the first means 9 preferably displays a high-pass and/or low-pass type performance in order to filter out of the first signals $Xa''$ the useful signals which, owing to the design of the acceleration signals, provide only the low-frequency shares of the vehicle body acceleration $Xa''$.

The objective of the invention is to superimpose on the processed first signals $Xa''$ the absent low-frequency information by defined superimposition with the second signals $Xar$, $Xar'$ and/or $dP$ of the spring deflection path and/or the spring deflection velocity and/or the pressure differences in the shock absorber, since these signals comprise the required low-frequency shares. This superimposition results in complemented signals of vehicle body motions. Such a complemented vehicle body motion signal, for instance, may be a vehicle body velocity signal $Xav'$ complemented by the low-frequency shares ("groundhook" shares) and/or a vehicle body path signal $Xav$ complemented by the low-frequency shares ("groundhook" shares).

Considering now that the second sensor means 7 provide second signals ($Xar$, $Xar'$ and/or $dP$) representing the spring deflection path ($Xa-Xr$) and/or the spring deflection velocity $d(Xa-Xr)/dt=(Xa-Xr)'$ and/or pressure differences $dP$ in the shock absorbers, one arrives all told at four different combination options of the first and second signals to be processed or the complemented body movement signals, respectively.

1. The spring deflection path (Xa−Xr) as output signal of the second sensor means 7 (second signals Xar) and the complemented body velocity (Xav') as complemented vehicle body movement signal.
2. The spring deflection velocity (Xa−Xr)' as output signal of the second sensor means 7 (second signals Xar') and the complemented body velocity (Xav') as complemented body movement signal.
3. The spring deflection path (Xa−Xr) as output signal of the first sensor means 7 (second signals Xar) and the complemented body path Xav as complemented body movement signal.
4. The spring deflection velocity (Xa−Xr)' as output signal of the first sensor means 7 (second signals Xar') and the complemented body path (Xav) as complemented body movement signal.

Derived therefrom, depending on the output signal of the first sensor means and the desired complemented body movement signals, are the following combination options:

$$Xav' = V1*G1(s)*Xa'' + V2*G2(s)*Xar' \quad (1),$$

$$Xav' = V1*G1(s)*Xa'' + V2*G2(s)*Xar \quad (2),$$

$$Xav = V1*G1(s)*Xa'' + V2*G2(s)*Xar' \quad (3),$$

$$Xav = V1*G1(s)*Xa'' + V2*G2(s)*Xar \quad (4),$$

where V1 and V2 are weighting factors that can be selected as balancing parameters or, e.g., as one.

In these combination options, particular allowance is to be made for the performance in the low-frequency range of the Xa'' useful signal, so that no adaptation problems will occur in the transition range of the Xa'' signal. Since in this transition range an adapted superimposition of the body signal with the relative path and/or velocity signal must take place for reconstruction of the low-frequency shares, a specific mathematical correlation is required between the transfer functions G1(s) and G2(s).

In the case of equations (1) and (3), in which the second signals Xar' and/or dP are captured which represent the spring deflection velocities of the body relative to the wheels and/or pressure differences in the shock absorbers, the mathematical correlation of the transfer functions G1(s) and G2(s) is given with:

$$G2(s) = 1 - s*G1(s) \quad (5).$$

In the case of equations (2) and (4), in which the second signals Xar representing the spring deflection path of the body relative to the wheels are captured, the mathematical correlation of the transfer functions G1(s) and G2(s) is given by:

$$G2(s) = s - s^2*G1(s) \quad (6)$$

A possible development of the invention is illustrated in FIG. 1. While the first signals Xa'' are processed in the first means 9 using the transfer function G1(s), the second signals Xar, Xar' and/or dP are passed to the second means 10 which relative to the first means 9 exhibit an "inverse" transfer performance G2(s). By combining the second signals with the desired complemented body movement [equations (1) through (4)], equation (5) or (6) describes the transfer performance G2(s) of the second means 10.

The weightings shown in equations (1) through (4) are effected by multiplication with the factors V1 and V2 in the first and second multiplication units 11 and 12. This takes place before the additive linkage of the output signals of the first and second means 9 and 10 in the first linkage means 13. As illustrated in FIG. 1, these weightings may be performed through multiplications by V1 and V2 in the first and second multiplication units 11 and 12. However, the weightings may also be carried out before and/or within the processing of the signals in the first and/or second means 9 and/or 10.

As a result of this inventional Xa'' signal conditioning, the signals Xav and/or Xav' are present on the output of the first linkage means 13, which signals represent the complemented body movements. These linkage results are passed on to the control and/or regulating unit 14 where the linkage results are utilized, under allowance for other variables representing the roadworthiness, for control and/or regulation of the absorber and/or the spring 6.

The further processing of the complemented body signals Xav' and/or Xav may be carried out, e.g., in the units for control and/or regulation 14, according to a control concept such as described for instance in the aforementioned German patent application P 39 18 735.7.

Available as output signals of the unit 14 are signals for activation of the undercarriage which is to be controlled and/or regulated. This is illustrated in FIG. 1 by a connection to the controllable-design absorber 3 and/or to the controllable design spring 6.

Especially favorable is the exclusive use of the low-frequency shares of the sensor signals of the relative paths and/or relative velocities between Ma and Mr and/or pressure differences in the absorbers. This can be accomplished through a filtering of the second signals Xar, Xar' and/or dP before the second means 10 with the transfer performance G2(s), in filter units with a low-pass type performance. Such a low-pass also may be an integral part of the activation unit 14.

Described so far with the aid of FIG. 1, the reduction of the invention requires two separate filter stages with the transfer performance G1(s) and G2(s). The hardware or software expense associated with it can be significantly reduced by additionally utilizing the correlations between the transfer functions presented in equations (5) and (6).

When inserting the equations (5) and (6) in the equations (1) through (4) and taking into account that the sequences of the operations of linear transfer elements can be traded, one arrives at the following four equations:

$$Xav' = G1(s)*[Xa'' - (V2/V1)*s*Xar'] + (V2/V1)*Xar' \quad (1'),$$

$$Xav' = G1(s)*[Xa'' - (V2/V1)*s^2*Xar] + (V2/V1)*s*Xar \quad (2'),$$

$$Xav = G1(s)*[Xa'' - (V2/V1)*s*Xar'] + (V2/V1)*Xar' \quad (3'),$$

$$Xav = G1(s)*[Xa'' - (V2/V1)*s^2*Xar] + (V2/V1)*s*Xar \quad (4'),$$

The embodiment illustrated in FIG. 2 shows such a simplified development of the invention. The assumption here is that the first signals Xar' represent the spring deflection velocity. According to the above equations (1') and (3'), the first signals (Xa') are transmitted to the first means 9, whose transfer properties are given by the transfer function G1(s). The second signals Xar are weighted by multiplication by the weighting factor V2/VI, in the third multiplication units 12', and transferred to the third means 15 with a differentiating transfer performance. The output signals of the third means 15 are additively linked in the second linkage means 17 with negative mathematical sign, with the first signals Xa", and the linkage result (output signals of the second linkage means) is passed on to the first means 9. The output signals of the first means 9 are weighted in the first multiplication units 11 by multiplication with the weighting factor V1 and subsequently linked in additive fashion, in the first linkage means 13, with the second signals weighted in the third multiplication units 12'. Available as linkage result on the output of the first linkage means 13, depending on the choice of transfer function G1(s) according to equations (1') or (3') is the complemented body path Xav or the complemented body velocity Xav', which then is utilized in the activation unit 14 for further undercarriage control.

The embodiment illustrated in FIG. 3 shows a simplified development of the invention for the case that the first signals Xar represent the spring deflection path (Xa−Xr). According to equations (2') or (4'), this circuitry arrangement differs from the one illustrated in FIG. 2 in that the second signals Xar, prior to the linkage in the first and second linkage means 13 and 17, are passed on to the fourth means 16 with a differentiating transfer performance. Available as linkage result on the output of the first linkage means 13, depending on the choice of transfer function G1(s) according to equations (2') or (4'), is then the complemented body path Xav or the complemented body velocity Xav', which in the activation unit 14 are then utilized for the further undercarriage control.

In the embodiments described above, also the pressure differences dP in the shock absorbers can be measured, instead of the spring deflection velocities (Xa−Xr)', and evaluated in analogy to the spring deflection velocity signals.

Due to the known trading of the sequence of the linear transfer members, further realization options of the invention are possible in addition to the circuitry arrangements shown in FIGS. 1 through 3, for instance by introduction of the weightings 11, 12, 12' at other points of the circuits, or by trading the differentiations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating control/regulation signals for at least one of control and regulation of a chassis on a vehicle, the vehicle including a body and a plurality of wheels, the chassis including at least one of a shock absorber and spring, comprising the steps of:
sensing an acceleration of the vehicle body;
providing first signals representing said sensed acceleration;
sensing relative movements between the vehicle body and wheels;
providing second signals representing said sensed relative movements;
filtering said first signals in a first filtering means, said first filtering means having at least a high-pass type transfer performance and providing output signals representing high-frequency portions of said first signals;
filtering said second signals in a second filtering means, said second filtering means having a transfer performance dependent on the transfer performance of said first filtering means and providing output signals representing low-frequency portions of said second signals;
additively combining said first filtering means output signals and said second filtering means output signals in a linkage means providing respective output signals; and
generating said control/regulation signals dependent on said linkage means output signals.

2. The method of claim 1, comprising the further step of controlling and regulating the chassis utilizing said control/regulation signals.

3. The method of claim 1, wherein said second filtering means is dependent on said transfer performance of said first filtering means according to the correlation:

$$G2(s) = 1 - s*G1(s),$$

where said second signals represent at least one of spring deflection velocities of the body relative to the wheels, and gas pressure differences in the shock absorbers;
and said second filtering means is dependent on said transfer performance of said first filtering means according to the correlation:

$$G2(s) = s - s^2*G1(s),$$

where said second signals represent a spring deflection path of the body relative to the wheels.

4. The method of claim 1, comprising the further steps of multiplying at least one of said first and second signals, and said filtered first and second signals, with weighting factors.

* * * * *